(12) United States Patent
Alnas (10) Patent No.: US 10,063,991 B2
(45) Date of Patent: Aug. 28, 2018

(54) FLEXIBLE DEVICE MANAGEMENT BOOTSTRAP

(71) Applicant: SONY CORPORATION, Tokyo (JP)

(72) Inventor: Svante Alnas, Lund (SE)

(73) Assignees: Sony Mobile Communications Inc., Tokyo (JP); Sony Corporation, Tokyo (JP)

( * ) Notice: Subject to any disclaimer, the term of this patent is extended or adjusted under 35 U.S.C. 154(b) by 591 days.

(21) Appl. No.: 14/231,250

(22) Filed: Mar. 31, 2014

(65) Prior Publication Data

US 2014/0304323 A1 Oct. 9, 2014

(30) Foreign Application Priority Data

Apr. 9, 2013 (EP) .................................. 13162932

(51) Int. Cl.
| | | |
|---|---|---|
| *G06F 15/16* | (2006.01) | |
| *H04W 4/00* | (2018.01) | |
| *H04W 24/02* | (2009.01) | |
| *H04L 12/24* | (2006.01) | |
| *H04W 4/50* | (2018.01) | |
| *H04W 4/60* | (2018.01) | |

(52) U.S. Cl.
CPC ......... *H04W 4/001* (2013.01); *H04L 41/0806* (2013.01); *H04L 41/0816* (2013.01); *H04W 4/50* (2018.02); *H04W 4/60* (2018.02); *H04W 24/02* (2013.01)

(58) Field of Classification Search
CPC .................................. H04W 4/50; H04W 4/60
USPC .......................................................... 709/228
See application file for complete search history.

(56) References Cited

U.S. PATENT DOCUMENTS

| | | | | |
|---|---|---|---|---|
| 8,516,133 B2* | 8/2013 | Smeets | ................. | G06F 21/445 370/331 |
| 2007/0143466 A1* | 6/2007 | Shon | ................. | H04L 29/12292 709/223 |
| 2008/0144590 A1* | 6/2008 | Rantanen | ............ | H04L 41/0806 370/338 |
| 2009/0019167 A1* | 1/2009 | Taaghol | ................ | G06F 9/4416 709/228 |
| 2009/0307474 A1* | 12/2009 | Johnston | ............... | G06F 21/572 713/2 |
| 2011/0296181 A1* | 12/2011 | Barriga | ................. | H04L 63/061 713/168 |
| 2012/0054839 A1 | 3/2012 | Friedlander et al. | | |

(Continued)

OTHER PUBLICATIONS

European Search Report for European Patent Application No. 13162932.1, dated Sep. 18, 2013, 9 pages.

(Continued)

*Primary Examiner* — Phuoc Nguyen
(74) *Attorney, Agent, or Firm* — Harrity & Harrity, LLP (57) ABSTRACT

A mobile communication device (100) sends a request (402) to a bootstrap server (310). The request (402) indicates selection information for selecting bootstrap data at the bootstrap server (310). The bootstrap server (310) selects the bootstrap data and sends the selected bootstrap data (404) to the mobile communication device (100). The mobile communication device (100) receives the selected bootstrap data (404) and, depending on the received bootstrap data (404), configures settings for management of the mobile communication device by a device management server (210).

20 Claims, 3 Drawing Sheets

(56) References Cited

U.S. PATENT DOCUMENTS

| | | | | |
|---|---|---|---|---|
| 2012/0072552 A1* | 3/2012 | Friedlander | ......... | H04L 41/0806 709/220 |
| 2012/0289222 A1* | 11/2012 | Venkatachalam | ....... | H04L 12/66 455/422.1 |
| 2013/0160094 A1* | 6/2013 | Luo | ....................... | H04W 12/12 726/4 |
| 2013/0203412 A1* | 8/2013 | Starsinic | ............... | H04W 4/001 455/435.1 |
| 2013/0239189 A1* | 9/2013 | Ionescu | ................. | H04W 12/06 726/6 |
| 2014/0040973 A1* | 2/2014 | Bhat | ....................... | G06F 21/10 726/1 |

OTHER PUBLICATIONS

Interop Technologies et al., "Bootstrap via DNS SRV Query; OMA-DM-DM13-2011-000x-CR_Boostrap_via_DNS_SRV_Query," Open Mobile Alliance Ltd., Feb. 10, 2011, 4 pages.
"OMA Device Management Bootstrap," Draft Version 1.3, OMA-TS-DM_Boostrap-V1_3-20110902-D, Sep. 2, 2011, 35 pages.
"OMA Device Management Bootstrap," Candidate Version 1.3, OMA-TS-DM_Bootstrap-V1_3-20120306-C, Mar. 6, 2012, 36 pages.
"Push Over the Air," Approved Version 2.3, OMA-TS-PushOTA-V2_3-20111122-A, Nov. 22, 2011, 90 pages.

* cited by examiner

FLEXIBLE DEVICE MANAGEMENT BOOTSTRAP

The present invention relates to methods of performing a device management bootstrap and to corresponding devices.

For mobile communication devices, it is known to perform device management (DM) from the network. For this purpose, a DM client in the mobile communication device may interact with a DM server in the network. Corresponding solutions are for example specified in the Open Mobile Alliance (OMA) DM specifications.

To enable the DM client to initiate a management session with the DM server, the DM client may need to be configured with certain DM settings. The process for provisioning the DM client with such settings is also referred to as "bootstrap". Procedures for performing a DM bootstrap are for example specified in OMA specification "OMA Device Management Bootstrap", Candidate Version 1.3 (Oct. 9, 2012). According to this specification, the bootstrap may for example be performed as customized bootstrap, as bootstrap from smartcard, or as bootstrap Over the Air (OTA). In the case of customized bootstrap, the DM settings are provisioned already at manufacture of the mobile communication device. In addition, a server initiated bootstrap or a client initiated bootstrap may be used. In the case of bootstrap from smartcard, the DM settings are loaded from a smartcard inserted into the mobile communication device. In the case of bootstrap OTA, the DM settings are provisioned from the network, using a Push procedure as defined in OMA specification "Push Over The Air", Approved Version 2.3 (Nov. 22, 2011).

However, the above-mentioned types of bootstrap procedures may not be satisfactory in some scenarios. For example, in the case of open market devices it is not known beforehand with which operator or service or service the mobile communication device will later be used. Accordingly, a customized bootstrap is not practical for open market devices. Similar considerations apply for the client initiated bootstrap, for the server initiated bootstrap, and for the OTA bootstrap, which require a priori knowledge of the correct operator specific or service specific bootstrap server by the mobile device or knowledge of device contact information in the network, respectively. The OTA bootstrap may further raise some security issues. For example, the mobile communication device may not be able to verify whether an OTA bootstrap package originates from a trusted source.

Accordingly, there is a need for techniques which allow for efficiently performing a DM bootstrap of a mobile communication device.

According to an embodiment of the invention, a method for performing a DM bootstrap of a mobile communication device is provided. The method may be implemented by a mobile communication device, e.g., a mobile phone, a smartphone, a tablet computer, a laptop computer, or a mobile digital assistant (MDA). In particular, the method may be implemented by a DM client in of the mobile communication device. According to the method, the mobile communication device sends a request to a bootstrap server. The request indicates selection information for selecting bootstrap data at the bootstrap server. Further, the mobile communication device receives the selected bootstrap data from the bootstrap server. The mobile communication device applies the received bootstrap data to configure settings for management of the mobile communication device by a DM server.

The identity of the bootstrap server may be preconfigured in the mobile communication device at manufacture of the mobile communication device, e.g., in terms of a Uniform Resource Locator (URL) or network address. Alternatively, the identity of the bootstrap server could be configured in an application which can be downloaded to the device. Also in this case, the identity of the bootstrap server may be defined in terms of a URL or network address.

The selection information may comprise a device identifier of the mobile communication device, e.g., in the form of an International Mobile Equipment Identity (IMEI), a model number, or the like. Alternatively or in addition, the selection information may comprise data related to a user identity associated with the mobile communication device, e.g., mobile country code, mobile network code of a network at which user of the mobile communication device is subscribed. Such network may also be referred to as the home network. Alternatively or in addition, the selection information may comprise data related to a network to which the mobile communication device is currently connected, e.g., mobile country code, mobile network code of the network to which the mobile communication device is currently connected. If this network is different from the home network, it may also be referred to as a visited network. Alternatively or in addition, the selection information may comprise data related to a service configured at the mobile communication device, e.g., whether a data service, an email service, or a multimedia service is configured at the mobile device.

Accordingly, the bootstrap server is provided with information which allows for selecting the correct bootstrap data for the mobile communication device. In this way, the same bootstrap server may be used for flexibly performing the DM bootstrap procedure of different types of mobile communication devices, for subscriptions at different operators, and for different services.

According to an embodiment, the mobile communication device may send the request in response to being associated with a new user identity. For example, this may include inserting a new Universal Integrated Circuit Card (UICC) or Subscriber Identification Module (SIM) card into the mobile communication device. Further, this may include changing of ownership of the mobile communication device, creating a new user account on the mobile communication device, or the like.

According to an embodiment, the mobile communication device may also send the request in response to connecting to the network of another operator, i.e., when connecting to a visited network.

Accordingly, the DM bootstrap procedure may be efficiently initiated when it is likely that new DM configuration settings are needed in the mobile communication device.

According to an embodiment, the request to the bootstrap server and the selected bootstrap data are transmitted on a secure channel, thereby increasing security of the DM bootstrap procedure. The secure channel may for example be implemented by using the Hypertext Transfer Protocol Secure (HTTPS) for requesting the bootstrap data. Alternatively or in addition, encryption of the request and of the transmitted bootstrap data may be used.

According to a further embodiment of the invention, a method for performing a DM bootstrap of a mobile communication device is provided. The method may be implemented by a bootstrap server, e.g., implemented in a network device hosted by a device manufacturer, a standardization body, or some other service provide. According to the method a bootstrap server receives a request from the mobile communication device. The request indicates selection information for selecting bootstrap data at the bootstrap server. Depending on the selection information in the request, the bootstrap server selects the bootstrap data. Further, the bootstrap server sends the selected bootstrap data to the mobile communication device.

The selection information may comprise a device identifier of the mobile communication device, e.g., in the form of an IMEI, a model number, or the like. Alternatively or in addition, the selection information may comprise data related to a user identity associated with the mobile communication device, e.g., mobile country code, mobile network code of the home network. Alternatively or in addition, the selection information may comprise data related to a network to which the mobile communication device is currently connected, e.g., mobile country code, mobile network code of a visited network. Alternatively or in addition, the selection information may comprise data related to a service configured at the mobile communication device, e.g., whether a data service, an email service, or a multimedia service is configured at the mobile device.

Accordingly, the bootstrap server is provided with information which allows for selecting the correct bootstrap data for the mobile communication device. In this way, the same bootstrap server may be used for performing the DM bootstrap procedure for different types of mobile communication devices, for subscriptions at different operators, and for different services.

According to an embodiment, wherein the bootstrap server selects the bootstrap data from a plurality of different types of bootstrap data configured in the bootstrap server. For example, the different types of bootstrap data may be operator specific. In addition or as an alternative, the different types of bootstrap data may be service specific.

According to a further embodiment of the invention, a mobile communication device is provided. The mobile communication device comprises an interface for connecting to a network. Further, the mobile communication device comprises a DM client for management of the mobile communication device by interaction with a DM server. The DM client is configured to send a request to a bootstrap server. The request indicates selection information for selecting bootstrap data at the bootstrap server. Further, the DM client is configured to receive the selected bootstrap data from the bootstrap server and. Further, the DM client is configured to apply the received bootstrap data to configure settings for management of the mobile communication device by the DM server.

The mobile communication device may be configured to operate in accordance with the above method to be implemented by a mobile communication device. For example, the DM client may send the request in response to being associated with a new user identity or send the request in response to connecting to the network of another operator, i.e., when connecting to a visited network. Further, the DM client may be configured perform transmission of the request and of the bootstrap data on a secure channel.

As above, the selection information may comprise a device identifier of the mobile communication device, data related to a user identity associated with the mobile communication device, data related to a network to which the mobile communication device is currently connected, and/or data related to a service configured at the mobile communication device.

According to a further embodiment of the invention, a network device is provided. The network device comprises an interface for connecting to a mobile communication device and a bootstrap server. The bootstrap server is configured to receive a request from the mobile communication device. The request indicates selection information for selecting bootstrap data at the bootstrap server. Further, the bootstrap server is configured to select bootstrap data. The selection is performed depending on the selection information in the request. The bootstrap server is further configured to send the selected bootstrap data to the mobile communication device.

The bootstrap server may be configured to operate in accordance with the above method to be implemented by a bootstrap server. For example, the bootstrap server may be configured to select the bootstrap data from a plurality of different types of bootstrap data configured in the bootstrap server. Further, the bootstrap server may be configured perform transmission of the request and of the bootstrap data on a secure channel.

As above, the selection information may comprise a device identifier of the mobile communication device, data related to a user identity associated with the mobile communication device, data related to a network to which the mobile communication device is currently connected, and/or data related to a service configured at the mobile communication device.

Although specific features described in the above summary and in the following detailed description are described in connection with specific embodiments and aspects, it is to be understood that the features of the embodiments and aspects may be combined with each other unless specifically noted otherwise.

Embodiments of the invention will now be described in more detail with reference to the accompanying drawings.

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments hereinafter.

The illustrated embodiments relate to methods and devices which allow for performing a DM bootstrap procedure of a mobile communication device. The mobile communication device may be a mobile phone, a smartphone, a tablet computer, a laptop computer, an MDA, or the like. Further, the mobile communication device may support communication over various network technologies. This may include cellular radio access technologies such as Global System for Mobile Communications (GSM), Code Division Multiple Access (CDMA) based cellular radio access technologies such as Universal Mobile Telecommunications System (UMTS), Wideband-CDMA, or CDMA2000, or the LTE (Long Term Evolution) cellular radio access technology specified by the $3^{rd}$ Generation Partnership Project. Further, the mobile communication device may also support other wireless access technologies, such as Wireless Local Area Network (WLAN) or WiMAX (Worldwide Interoperability for Microwave Access). Further, also wire-based accesses may be supported. In the following, the mobile communication device will also be simply referred to as "device".

The mobile communication device may be an open market device which is not tailored for usage with a specific operator or service. Accordingly, settings configured at manufacture of the device are assumed to be independent from specific services and operators. For performing the DM bootstrap, the identity of at least one generic bootstrap server may be preconfigured in the device at manufacture. Alternatively, the identity of the bootstrap server could also be configured by the vendor. According to a further alternative, the identity of the bootstrap server may be configured in an application which can be downloaded to the device. In some scenarios, also identities of multiple bootstrap servers may be configured in the device, e.g., using one or more of the above configuration alternatives. However, the following explanations will mainly focus on a scenario with only one bootstrap server, bearing in mind that the similar procedures may be iterated with respect to further bootstrap servers. In each case, the identity of the bootstrap server may be defined in terms of a URL or network address.

The bootstrap server may be hosted by a device manufacturer, a standardization body, or some other service provider. The bootstrap server may be configured with various types of bootstrap data which apply to different operators, services or device types. According to the illustrated concepts, the mobile communication device sends a request to the bootstrap management server. The request includes selection information which allows the bootstrap server to select the correct bootstrap data for this particular device. In this way, the bootstrap server may efficiently perform the bootstrap procedure with respect to various types of devices, operators, or services.

Figure 1:
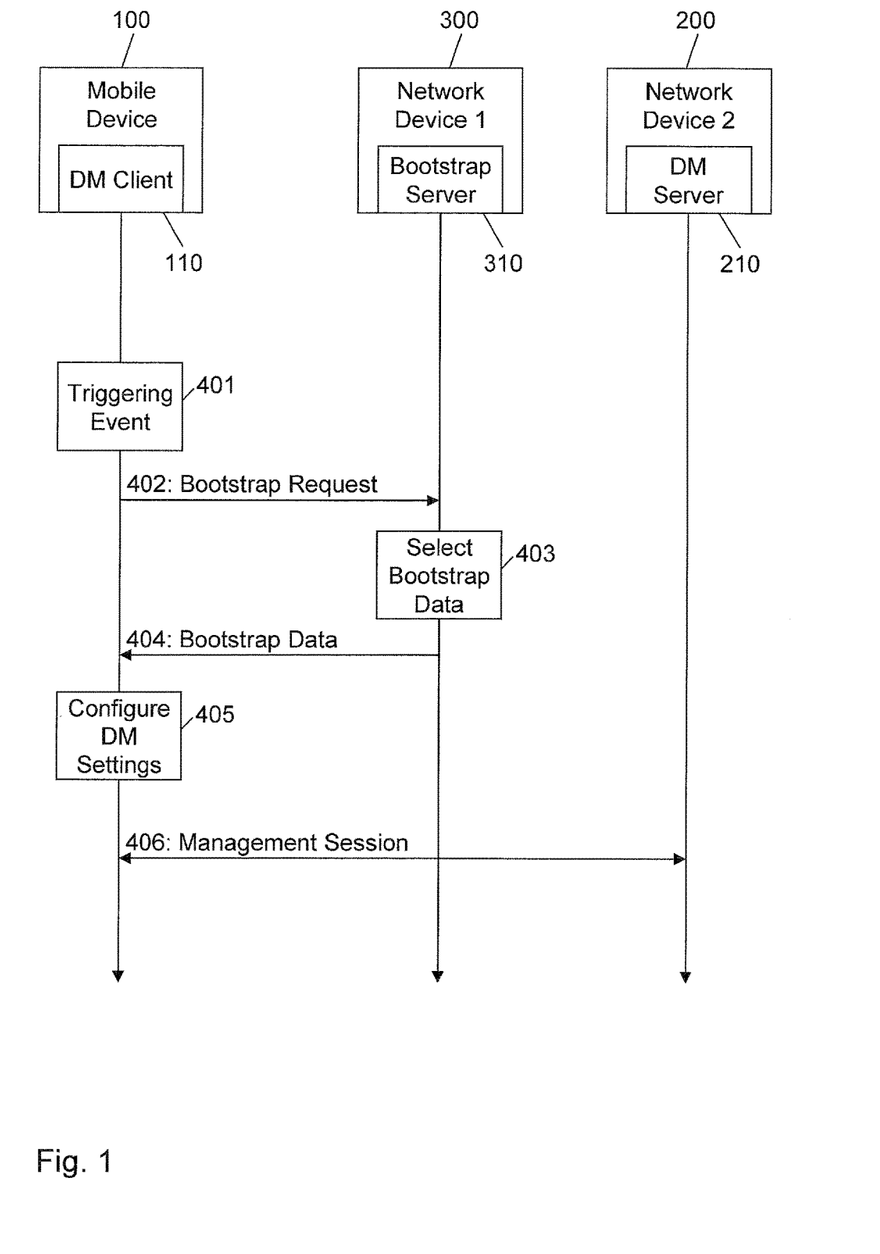
FIG. 1 shows a signalling diagram for illustrating methods for a device management bootstrap according to an embodiment of the invention.

An exemplary DM bootstrap procedure according to the above concepts is illustrated in FIG. 1. The bootstrap procedure of FIG. 1 involves the mobile communication device 100, and network devices 200, 300. The network device 200 implements a DM server 210. The network device 300 implements the bootstrap server 210.

As illustrated, the DM bootstrap procedure may be initiated in response to a triggering event 401 at the mobile communication device 100. The DM client 110 in the device 100 may detect the triggering event 401 and, in response to detecting the triggering event 401, send a bootstrap request 402 to the bootstrap server 310.

The triggering event 401 may for example correspond to a process of associating the device 100 with a new user identity, e.g., when ownership of the device 100 changes. This may include inserting a new UICC with a SIM of a new user identity with associated subscription at a network operator. Further, this may also include creating a new user account on the device 100.

The triggering event 401 may also correspond to a process of connecting the device 100 to a visited network, e.g., when the device starts roaming in another operator's network.

The triggering event 401 may also correspond to some other type of triggering event, e.g., a manual input from the user or resetting the device 100 to factory settings.

The above exemplary types of triggering events allow for efficiently initiating the DM bootstrap procedure when it is likely that new DM configuration settings are needed in the device 100.

The DM client 110 in the device 100 may send the bootstrap request 402 on a communication channel between the device 100 and the network device 300. The communication channel may be established using suitable interfaces of the device 100 and of the network device 300. The interface of the device 100 may be a wireless interface. The communication channel may for example be established using an Internet Protocol (IP) based packet data connection of the device 100. Accordingly, the network device 300 may be accessible via the Internet. The bootstrap server 310 may then for example be implemented as a Web server which can be accessed using the Hypertext Transfer Protocol (HTTP).

As mentioned above, the identity of the bootstrap server 310 may be preconfigured in the device 100 at manufacture or by the vendor. The identity of the bootstrap server may also be configured in an application data which can be downloaded to the device. For example, if an IP based packet data connection is used for transmitting the bootstrap request, the identity of the bootstrap server 310 may be stored as an IP address or as a URL.

Preferably, a secure transport mechanism is used for conveying the bootstrap request 402. For example, the bootstrap request 402 may be transmitted as HTTPS GET message. Other security mechanisms could be used as alternative or in addition, e.g., encryption of the bootstrap request 402. Corresponding security credentials, e.g., a certificate or encryption key, may be preconfigured in the device 100 at manufacture or by the vendor, together with the identity of the bootstrap server 310.

The DM client 110 includes selection information into the bootstrap request 402, thereby enabling the bootstrap server 310 to select the correct bootstrap data for the device 100. The selection information may be included as additional parameters into the bootstrap request 402, e.g., in a message body of a HTTP or HTTPS request.

The selection information may include various types of device related information. For example, the selection information may include a device identifier of the device 100, e.g., in the form of an IMEI, a model number, or the like. Alternatively or in addition, the selection information may include data related to a user identity associated with the device 100, e.g., mobile country code, mobile network code of the home network, as typically stored in the SIM of the device 100. Alternatively or in addition, the selection information may include data related to a network to which the device 100 is currently connected, e.g., mobile country code, mobile network code of a visited network when the device is roaming in another operator's network. Alternatively or in addition, the selection information may include data related to a service configured at the device 100, e.g., whether a certain data service, a certain email service, or a certain multimedia service is supported by the device 100 and/or the user's subscription.

The bootstrap server 310 receives the bootstrap request 402 and uses the selection information in the bootstrap request 402 to select the correct bootstrap data for the device 100, as indicated by step 403. The bootstrap data may for example include DM account information and connectivity information for enabling the DM client 110 to initiate a management session with the DM server 210.

For example, if the selection information indicates that the device 100 is associated with a subscription with a certain operator in a certain country, e.g., as indicated by the mobile country code and mobile network code of the home network, the bootstrap server 310 select bootstrap data corresponding to this operator and country. In addition, if the selection information indicates that the device 100 starts roaming in a certain visited network, e.g., as indicated by the mobile country code and mobile network code of the visited network, the bootstrap server 310 may select bootstrap data corresponding to this visited network.

The bootstrap server 310 then sends a response with the selected bootstrap data 404 to the device 100. This may be accomplished using the same communication channel which was also used for transmitting the bootstrap request. For example, the bootstrap data may be transmitted in a HTTP response or HTTPS response, depending on the transport mechanism used for sending the bootstrap request. Further, the selected bootstrap data 404 may be transmitted using the same security mechanism which was used for transmission of the bootstrap request 402.

The DM client 110 in the device 100 receives the selected bootstrap data 404 and configures DM settings according to the received bootstrap data 404, as indicated by step 405. Using these DM settings, the DM client 110 may then initiate a management session 406 with the DM server 210. The management session may be used to perform further configurations in the device 100, e.g., configuration of settings for accessing a certain service.

The DM bootstrap procedure may be repeated as necessary, e.g., in response to a new triggering event similar to the triggering even 401.

Figure 2:
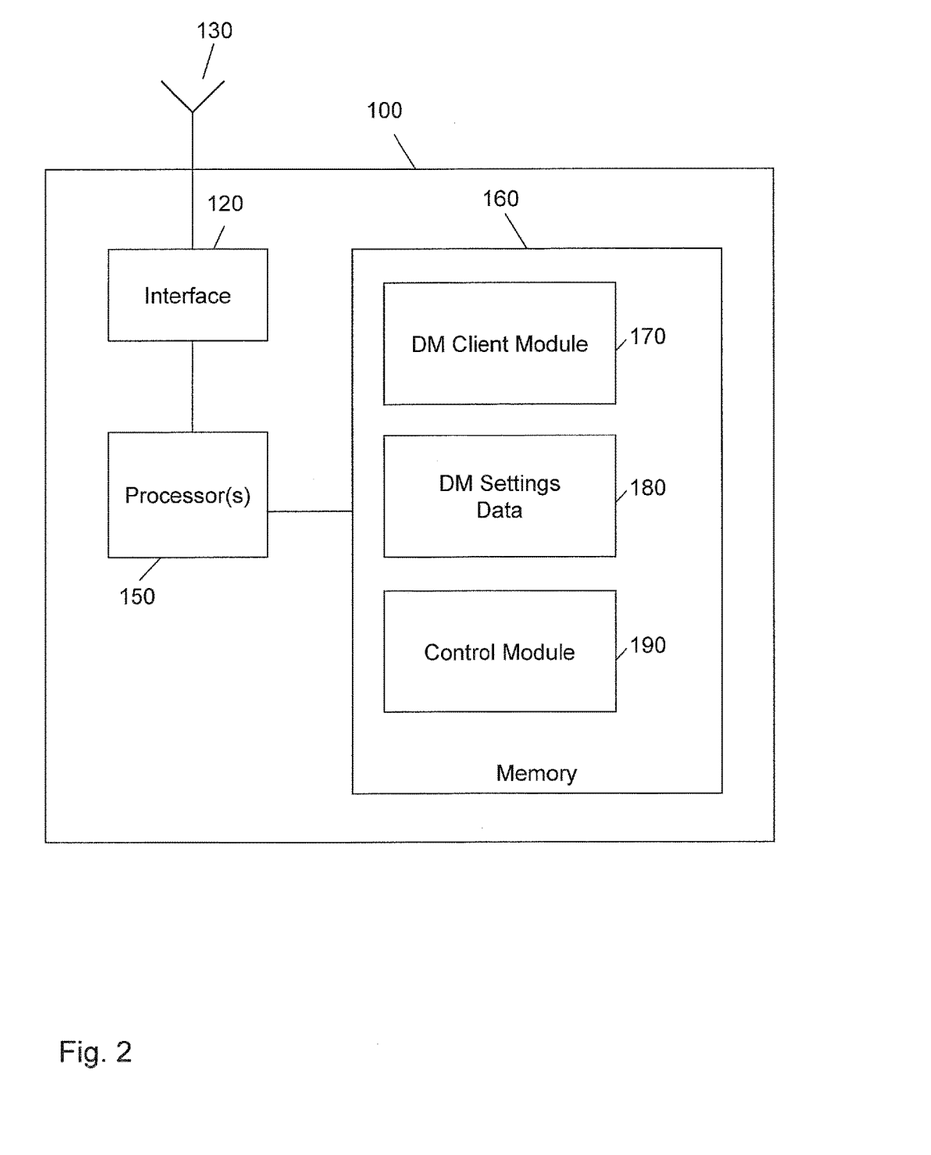
FIG. 2 schematically illustrates a mobile communication device according to an embodiment of the invention.

FIG. 2 schematically illustrates an exemplary implementation of the mobile communication device 100.

In the illustrated implementation, the device 100 is provided with an interface 120 which allows for connecting the device 100 to a network. As illustrated, the interface 120 may be implemented as a wireless interface which allows for sending and receiving data via one or more antennas 130. For example, the interface 120 may support one or more of the above-mentioned wireless access technologies, e.g., GSM, UMTS, Wideband-CDMA, CDMA2000, LTE, WLAN, or WiMAX. In addition, the interface 120 may support IP based packet data connections.

Further, the device 100 is provided with one or more processors 150 coupled to the interface 120 and a memory 160 coupled to the processor(s) 150. The memory 160 may include suitable types of non-volatile and/or volatile memory, e.g., Random Access Memory (RAM), Read Only Memory (ROM), Flash memory, or magnetic storage. The memory 160 may include data and/or program code to be used by the processor 150 for implementing functionalities of the device 100 as explained above.

In particular, the memory 160 may include a DM client module 170 with program code to be executed by the processor(s) 150 for implementing the functionalities of the DM client 110 as explained above, e.g., detecting the triggering event 401, sending the bootstrap request 402 with the selection information via the interface 120, receiving the selected bootstrap data 404, and applying the received bootstrap data 404 to configure the DM settings of the device 100.

Further, the memory 160 may also include DM settings data 180 which are configured using the DM bootstrap procedure and utilized for initiating a management session. The DM settings data may also include the preconfigured identity of the bootstrap server 310 and optionally required security credentials for connecting to the bootstrap server 310.

Still further, the memory 160 may include a control module 190 with program code for implementing generic control functionalities of the device 100, e.g., controlling the interface 120 or other functionalities of the device 100.

It is to be understood that the illustration of FIG. 2 is merely schematic and that the device 100 may include other components which have not been illustrated, e.g., an interface for connecting a UICC, one or more input or output devices, one or more further interfaces, or other known components of a mobile communication device.

Figure 3:
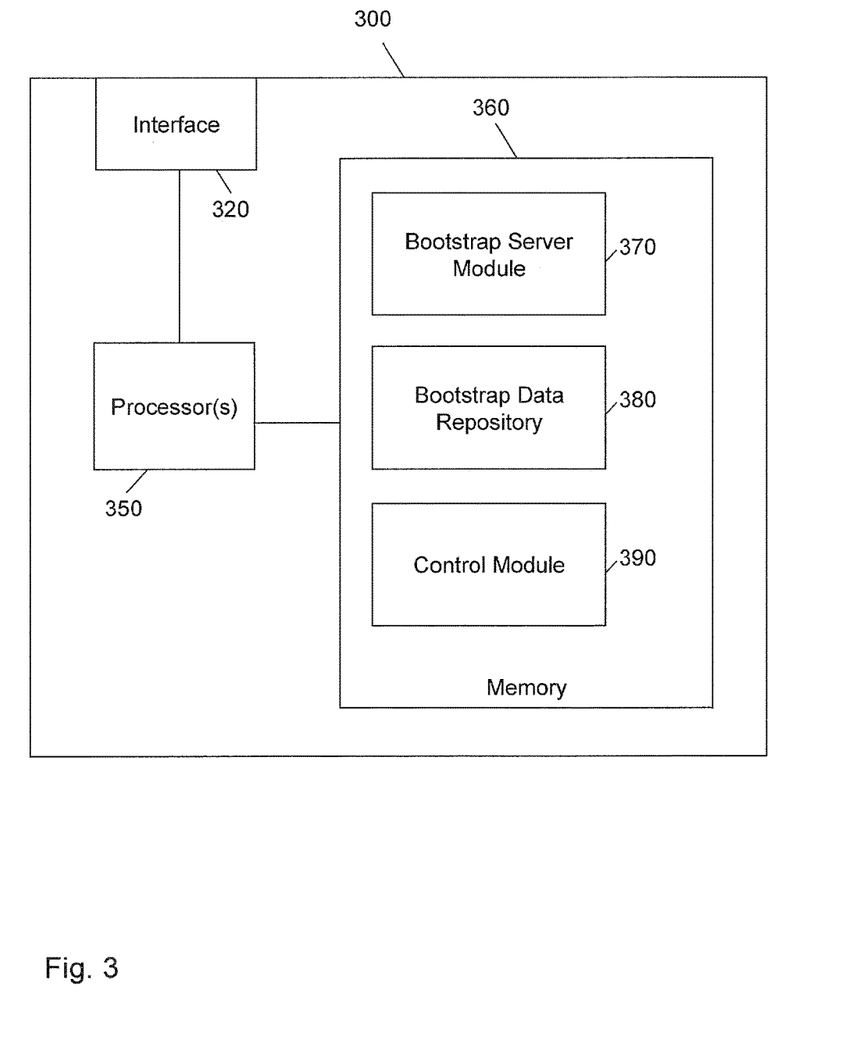
FIG. 3 schematically illustrates network device according to an embodiment of the invention.

FIG. 3 schematically illustrates an exemplary implementation of the network device 300.

In the illustrated implementation, the network device 300 is provided with an interface 320 which allows for connecting the network device to one or more mobile communication devices, e.g., to the mobile communication device 100.

The interface 320 may for example support IP based packet data connections. Specifically, the interface may implement a Web interface.

Further, the network device 300 is provided with one or more processors 350 coupled to the interface 320 and a memory 360 coupled to the processor(s) 350. The memory 360 may include suitable types of non-volatile and/or volatile memory, e.g., RAM, ROM, Flash memory, or magnetic storage. The memory 360 may include data and/or program code to be used by the processor 350 for implementing functionalities of the network device 300 as explained above.

In particular, the memory 360 may include a bootstrap server module 370 with program code to be executed by the processor(s) 350 for implementing the functionalities of the bootstrap server 310 as explained above, e.g., receiving the bootstrap request 402 with the selection information via the interface 320, selecting the bootstrap data, and sending the selected bootstrap data 404 via the interface 320.

Further, the memory 360 may also include a bootstrap data repository 380 which stores the plurality of different types of bootstrap data from which the selection is performed.

Still further, the memory 360 may include a control module 390 with program code for implementing generic control functionalities of the network device 300, e.g., controlling the interface 320 or other functionalities of the device 300.

It is to be understood that the illustration of FIG. 3 is merely schematic and that the device 300 may include other components which have not been illustrated, e.g., a management interface for managing the bootstrap repository data, or known components of a network device for implementing a Web server.

As can be seen, the concepts as explained above may be used to provide a DM system which includes the mobile communication device 100 with the DM client 110, the bootstrap server 310, and optionally also the DM server 210. In such DM system, mobile communication device 100 may send the bootstrap request 402 with the selection information to the bootstrap server 310. The bootstrap server 310 may select the bootstrap data and send the selected bootstrap data 404 to the mobile communication device 100. The mobile communication device 100 may receive the selected bootstrap data 404 and, depending on the received bootstrap data 404, configure settings for management of the mobile communication device 100 by the DM server 210. This allows for implementing the DM bootstrap procedure in a flexible manner. In particular, the same bootstrap server 310 can flexibly perform the bootstrap procedure for different types of mobile communication devices, for subscriptions at different operators, and for different services.

It is to be understood that the concepts as explained above are susceptible to various modifications. For example, the concepts could be applied with a plurality of bootstrap servers. In such cases, the mobile communication device could perform the DM bootstrap procedure as explained above with each of these bootstrap servers, e.g., to configure DM settings for different DM servers. Further, the concepts could be implemented using different hardware structures than illustrated in FIGS. 2 and 3. For example, rather than using software code executed by one or more processors, at least some of the illustrated functionalities could be implemented by dedicated hardware.

The invention claimed is:
1. A method, comprising:
encrypting, by a mobile communication device and based on an encryption key, a request, to be provided to a bootstrap server, to generate an encrypted request,
the encryption key and an identity of the bootstrap server being preconfigured in the mobile communication device, and
the encrypted request including selection information for selecting bootstrap data at the bootstrap server, the selection information including:
data related to a user identity associated with the mobile communication device, and
data related to a network to which the mobile communication device is currently connected;
sending, by the mobile communication device and based on the identity of the bootstrap server, the encrypted request to the bootstrap server;
receiving, by the mobile communication device and based on the selection information included in the encrypted request, the bootstrap data from the bootstrap server; and
utilizing, by the mobile communication device, the bootstrap data to configure settings for management of the mobile communication device by a device management server.
2. The method according to claim 1, wherein the selection information further includes at least one of:
a device identifier of the mobile communication device, or
data related to a service configured at the mobile communication device.
3. The method according to claim 1,
wherein the mobile communication device sends the encrypted request based on being associated with a new user identity.
4. The method according to claim 1,
wherein the mobile communication device sends the encrypted request based on connecting to the network.
5. The method according to claim 1,
wherein the encrypted request and the bootstrap data are transmitted on a secure channel.
6. The method according to claim 1,
wherein the mobile communication device sends the encrypted request based on insertion of a Universal Integrated Circuit Card (UICC) in the mobile communication device.
7. A method, comprising:
receiving, by a bootstrap server and from a mobile communication device, an encrypted request,
the mobile communication device encrypting the encrypted request based on an encryption key,
the encryption key and an identity of the bootstrap server being preconfigured in the mobile communication device,
the mobile communication device sending the encrypted request to the bootstrap server based on the identity of the bootstrap server, and
the encrypted request including selection information for selecting bootstrap data at the bootstrap server, the selection information including:
data related to a user identity associated with the mobile communication device, and
data related to a network to which the mobile communication device is currently connected;
selecting, by the bootstrap server, the bootstrap data based on the selection information; and
sending, by the bootstrap server, the bootstrap data to the mobile communication device,
the mobile communication device utilizing the bootstrap data to configure settings for management of the mobile communication device by a device management server.
8. The method according to claim 7, wherein the selection information further includes at least one of:
a device identifier of the mobile communication device, or
data related to a service configured at the mobile communication device.
9. The method according to claim 7,
wherein the encrypted request and the bootstrap data are transmitted on a secure channel.
10. The method according to claim 7,
wherein the bootstrap data is selected from a plurality of different types of bootstrap data.
11. The method according to claim 10,
wherein the plurality of different types of bootstrap data are operator specific or service specific.
12. A mobile communication device, comprising:
one or more processors to:
encrypt, based on an encryption key, a request, to be provided to a bootstrap server, to generate an encrypted request,
the encryption key and an identity of the bootstrap server being preconfigured in the mobile communication device, and
the encrypted request including selection information for selecting bootstrap data at the bootstrap server,
the selection information including:
data related to a user identity associated with the mobile communication device, and
data related to a network to which the mobile communication device is currently connected;
send, based on the identity of the bootstrap server, the encrypted request to the bootstrap server;
receive, based on the selection information included in the encrypted request, the bootstrap data from the bootstrap server; and
utilize the bootstrap data to configure settings for management of the mobile communication device by a device management server.
13. A device, comprising:
one or more processors to:
receive an encrypted request from a mobile communication device,
the mobile communication device encrypting the encrypted request based on an encryption key,
the encryption key and an identity of the device being preconfigured in the mobile communication device,
the mobile communication device sending the encrypted request to the device based on the identity of the device, and
the encrypted request including selection information for selecting bootstrap data at the device, the selection information including:
data related to a user identity associated with the mobile communication device, and
data related to a network to which the mobile communication device is currently connected;
select the bootstrap data based on the selection information; and send the bootstrap data to the mobile communication device,
    the mobile communication device utilizing the bootstrap data to configure settings for management of the mobile communication device by a device management server.

14. The mobile communication device of claim 12, where the selection information further includes at least one of:
    a device identifier of the mobile communication device, or
    data related to a service configured at the mobile communication device.

15. The mobile communication device of claim 12, where the mobile communication device sends the encrypted request based on being associated with a new user identity.

16. The mobile communication device of claim 12, where the mobile communication device sends the encrypted request based on connecting to the network.

17. The mobile communication device of claim 12, where the encrypted request and the bootstrap data are transmitted on a secure channel.

18. The mobile communication device of claim 12, where the mobile communication device sends the encrypted request based on insertion of a Universal Integrated Circuit Card (UICC) in the mobile communication device.

19. The device of claim 13, where the encrypted request and the bootstrap data are transmitted on a secure channel.

20. The device of claim 13, where the bootstrap data is selected from a plurality of different types of bootstrap data.

* * * * *